United States Patent
Gosselin et al.

(10) Patent No.: US 10,306,553 B2
(45) Date of Patent: May 28, 2019

(54) TECHNIQUE FOR MANAGING A STATE OF ACTIVATION OF A RADIO ACCESS NETWORK IN A LOCAL AREA NETWORK

(71) Applicant: Orange, Paris (FR)

(72) Inventors: Thomas Gosselin, Le Plessis Robinson (FR); Cyril Del Missier, La Garenne Colombes (FR)

(73) Assignee: ORANGE, Paris (FR)

( * ) Notice: Subject to any disclaimer, the term of this patent is extended or adjusted under 35 U.S.C. 154(b) by 225 days.

(21) Appl. No.: 14/671,484

(22) Filed: Mar. 27, 2015

(65) Prior Publication Data

US 2015/0282050 A1 Oct. 1, 2015

(30) Foreign Application Priority Data

Mar. 28, 2014 (FR) ..................... 14 52732

(51) Int. Cl.
*H04W 48/08* (2009.01)
*H04W 48/18* (2009.01)
(Continued)

(52) U.S. Cl.
CPC ........ *H04W 52/0206* (2013.01); *H04W 92/06* (2013.01); *Y02D 70/142* (2018.01); *Y02D 70/144* (2018.01); *Y02D 70/162* (2018.01)

(58) Field of Classification Search
CPC . H04W 48/08; H04W 48/18; H04W 52/0206; H04W 76/025; H04W 88/16; H04W 92/06

See application file for complete search history.

(56) References Cited

U.S. PATENT DOCUMENTS

| 2011/0028085 A1* | 2/2011 | Waung | H04W 88/04 455/7 |
| 2012/0210401 A1 | 8/2012 | Pepin et al. | |

(Continued)

FOREIGN PATENT DOCUMENTS

| FR | 2951897 A1 | 4/2011 |
| FR | 2968156 A1 | 6/2012 |
| FR | 2992517 A1 | 12/2013 |

OTHER PUBLICATIONS

English translation of Written Opinion dated Feb. 13, 2015 for corresponding French Patent Application No. FR1452732, filed Mar. 28, 2014.
(Continued)

*Primary Examiner* — Luat Phung
(74) *Attorney, Agent, or Firm* — David D. Brush; Westman, Champlin & Koehler, P.A.

(57) ABSTRACT

A method and apparatus are provided for managing a state of activation of a radio access network in a local area network. A gateway allows access to a wide area communication network to devices of the local area network and communicates with at least one of the devices of the local area network by way of the radio access network, termed the main network. The gateway is associated with a device of the local area network on a secondary radio access network, termed the command network, distinct from the main network. A message is received by the gateway on the command network originating from the device. When the state of activation of the main network is deactivated, the gateway activates the main network. A connection between the device and the gateway can then be established on the main network.

10 Claims, 3 Drawing Sheets

(51) Int. Cl.
*H04W 52/02* (2009.01)
*H04W 92/06* (2009.01)

(56) References Cited

U.S. PATENT DOCUMENTS

| | | | |
|---|---|---|---|
| 2014/0126486 A1 | 5/2014 | Brequigny et al. | |
| 2014/0337923 A1* | 11/2014 | Anders | H04W 52/0229 |
| | | | 726/4 |
| 2015/0271808 A1* | 9/2015 | Liang | H04W 4/008 |
| | | | 370/329 |
| 2015/0326774 A1* | 11/2015 | Chinery, III | H04N 7/181 |
| | | | 348/207.1 |

OTHER PUBLICATIONS

French Search Report and Written Opinion dated Feb. 13, 2015 for corresponding French Application No. 1452732, filed Mar. 28, 2014.

* cited by examiner

TECHNIQUE FOR MANAGING A STATE OF ACTIVATION OF A RADIO ACCESS NETWORK IN A LOCAL AREA NETWORK

CROSS-REFERENCE TO RELATED APPLICATIONS

This Application claims priority from French Application No. 14 52732, filed on Mar. 28, 2014, the content of which is incorporated herein by reference in its entirety.

FIELD OF THE DISCLOSURE

The present disclosure pertains to the general field of telecommunications.

The present disclosure relates more particularly to a technique for managing a state of activation of a radio access network in a local area network, a gateway allowing access to a wide area communication network to devices of the local area network and communicating with at least one of the devices of the local area network by way of the radio access network.

The access gateway allows in particular devices located in a client site to access a wide area communication network WAN (for "Wide Area Network"), such as the Internet network. These devices are also called CPE, for "Customer Premise Equipment". For a local area network, these entail in particular the access gateway, a "Set-Top-Box" TV decoder, a mobile terminal. These various devices exchange data in the local area network by way of radio communication channels, using in particular the wireless transmission technology based on the IEEE 802.11 radioelectric network standard and its upgrades commonly grouped together under the term Wi-Fi (for "Wireless Fidelity").

BACKGROUND OF THE DISCLOSURE

It is currently possible for a device of the local area network to control, to configure or else to parametrize the gateway on the basis of an application executing on the device. By way of illustrative example, for a LiveBox, this entails the "my LiveBox" application executing on a mobile terminal. This application makes it possible for example to parametrize the Wi-Fi connection of the LiveBox by defining activation timeslots; this makes it possible to turn off the Wi-Fi automatically every night for example. It is also possible on the basis of this application to command the turning off of the Wi-Fi. The user of the mobile terminal can thus act on the LiveBox remotely by way of the Wi-Fi communication network.

But, when the Wi-Fi is turned off, the user can no longer benefit from this remote command interface.

SUMMARY

According to a first aspect, the subject of the present disclosure is a method of management of a state of activation of a radio access network in a local area network. A gateway allows access to a wide area communication network to devices of the local area network and communicates with at least one of the devices of the local area network by way of the radio access network, termed the main network. The method comprises the following steps implemented by the gateway:

association of a device of the local area network with the gateway on a secondary radio access network, termed the command network, distinct from the main network;

reception of a message originating from said device on the command network;

when the state of activation of the main network is deactivated, activation of the main network;

establishment of a connection between said device and the gateway on the main network.

It is possible, by virtue of a message transmitted by the device to the gateway on the command network, to activate the main network, so as to allow the device to access the wide area communication network. The device of the local area network and the access gateway are each equipped with a secondary radio access module, termed the command module, as a supplement to a main radio access module.

In a particular embodiment, the main radio access module is a Wi-Fi radio module and the secondary radio access module is a low-consumption radio access module, such as Bluetooth®, Zigbee® or Z-Wave®. The main radio access module makes it possible to form the main communication network, carrying the exchanges in the local area network partly or totally. The secondary radio access module makes it possible to form the command network allowing the devices of the local area network to communicate with the access gateway, even when the main network is deactivated.

The device of the local area network dialogs directly within the local area network with the gateway. The message dispatched by the device does not travel through intermediate devices located outside of the local area network. When this device of the local area network has direct access to a mobile network, for example of 3G type, it would be conceivable to transmit the message by means of the mobile network, and then from the access of the gateway to the wide area network. However, this solution requires firstly direct access to the mobile network for the device of the local area network, and then that the latter is situated in a coverage zone where access to the mobile network is possible and lastly that access to the wide area communication network is in a state of operation. Use of a command network within the local area network thus makes it possible to circumvent the proper operation of equipment external to the local area network. A local area command network also makes it possible to limit costs in respect of access to a mobile network for the devices of the local area network. The technique for managing an activation state operates in particular whatever the coverage of the mobile network relative to the coverage of the local area network. Furthermore, when the command network is of low-consumption type, the implementation of the method requires little energy. The association of the device with the gateway on the command network can be triggered automatically by the device. The mechanism is thus transparent to the user of the device of the local area network.

The deactivation or placement on standby of the main network may have been commanded by the device of the local area network or else on account of a placement on standby programmed on the gateway.

The various embodiments or characteristics mentioned hereinafter can be added independently or in combination with one another, to the steps of the management method as defined above.

In a particular embodiment, the gateway commands the association of the device with the gateway subsequent to a first establishment of connection of the device on the main network.

The association of the device with the gateway on the command network is commanded by the gateway during the first association. The mechanism is thus transparent to the user of the device of the local area network.

According to a particular characteristic, the association command furthermore comprises at least one item of data necessary for the association of the device with the gateway.

The gateway thus transmits by virtue of the connection established on the main communication network one or more data items which are thereafter used during association on the command network. No input is thus required on the part of the user of the device of the local area network.

In a particular embodiment, the message received is a main network activation command.

The device of the local area network can thus command the activation of the main network by way of the command network.

According to a particular characteristic, the activation command is transmitted when execution of a service is scheduled on said device, said execution requiring access to the wide area communication network.

The device of the local area network can thus activate the main network remotely when execution of a service is scheduled. By way of illustrative example, a recording of a TV transmission is scheduled on the device from midnight and the Wi-Fi of the gateway is actually placed on standby every night. The device can then command the enabling of the Wi-Fi of the gateway by means of the command network.

In a particular embodiment, the message received is a request for association of the device with the gateway on the command network.

As soon as a device of the local area network is associated on the command network, the gateway can activate (re-enable) its main communication network. This makes it possible to manage the activation of the main radio network, as a function of the needs of the devices of the local area network. By way of illustrative example, the arrival of a mobile terminal in the local area network can be detected by the gateway on account of its association on the command network and the gateway re-enables the Wi-Fi network.

In a particular embodiment, deactivation of the main network is triggered by the gateway when there is no longer any device of the local area network associated on the command network.

The absence of devices associated with the gateway on the command network thus makes it possible to easily detect that the main communication network may be placed on standby. This makes it possible to decrease energy consumption and to limit radio transmissions in the absence of devices.

In a particular embodiment, the gateway transmits a command for enabling a main radio access module of the device on the command network.

This makes it possible to remotely manage activation of the radio module allowing the device to communicate on the main network. Indirectly, this also makes it possible to deactivate the radio module of the device, since in order to re-activate it, there is no longer any necessity to act manually on the device. The management of the main network is thus simplified for the user.

According to a second aspect, the present disclosure also relates to an access gateway allowing access to a wide area communication network to devices of the local area network and communicating with at least one of the devices of the local area network by way of the radio access network, termed the main network. The gateway comprises:
  a main radio access module, designed to communicate on the main network;
  a secondary radio access module, distinct from the main radio access module, designed to communicate with a device of the local area network on the command network;
  an association management module, designed to associate the gateway and a device of the local area network on one of the networks, main or command;
  a module for activation/deactivation of the main network, designed to modify the state of activation of the main network from deactivated to activated on receipt of a message originating from a device on the command network.

The advantages stated in respect of the management method according to the first aspect are directly transposable to the access gateway.

According to a third aspect, the present disclosure also relates to a system in a local area network, comprising an access gateway according to the second aspect and at least one device of the local area network, said device comprising:
  a main radio access module, designed to communicate on the main network with at least the gateway;
  a secondary radio access module, distinct from the main radio access module, designed to communicate with the gateway on the command network;
  a module for dispatching a message to the gateway on the command network.

The advantages stated in respect of the management method according to the first aspect are directly transposable to the system.

According to a fourth aspect, the present disclosure relates to a program for an access gateway, comprising program code instructions intended to command the execution of those of the steps of the above-described management method that are implemented by the access gateway, when this program is executed by this gateway and a recording medium readable by an access gateway and on which a program for a gateway is recorded.

The advantages stated in respect of the management method according to the first aspect are directly transposable to the program for an access gateway and to the recording medium.

BRIEF DESCRIPTION OF THE DRAWINGS

The present disclosure will be better understood with the aid of the following description of particular embodiments of the management technique, with reference to the appended drawings in which.

DETAILED DESCRIPTION OF ILLUSTRATIVE EMBODIMENTS

Figure 1:
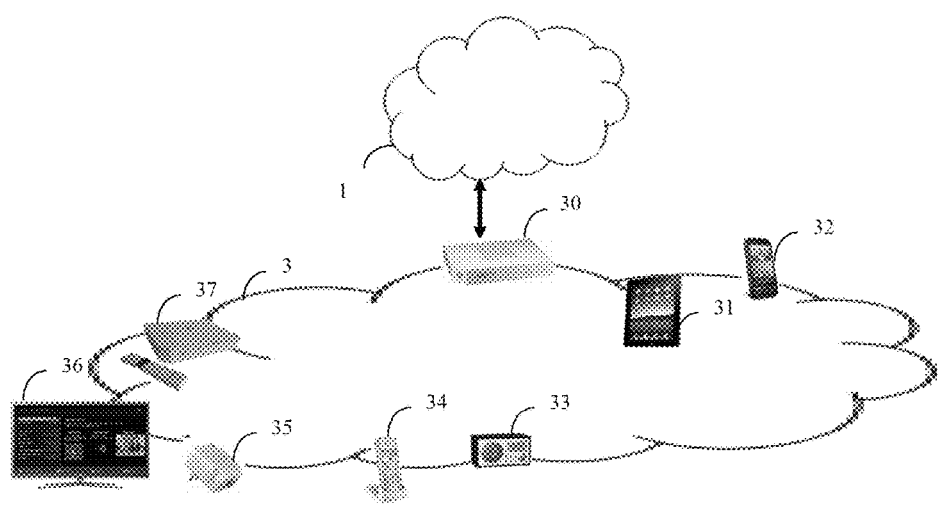
FIG. 1 represents a local area network in which is implemented the management technique according to a particular embodiment.

FIG. 1 represents a private or local communication network 3. The IP (for "Internet Protocol") protocol is used by the devices in the local area network to communicate with one another and also to communicate with a wide area communication network or WAN (for "Wide Area Network"), such as the Internet network.

For the environment represented in FIG. 1, local communication network 3 is intended to mean a network of LAN ("Local Access Network") type. This network may in particular be a domestic network or a company network. An access gateway 30 is designed to provide access to the wide area communication network (for example the Internet) to devices of the local area network 3 by way of an access network 1. The access gateway 30 ensures the conveying of the data between the access network 1 and the local area network 3. This is for example a domestic gateway or else a company gateway. The access network 1 is for example an xDSL access network (for "Digital Subscriber Line", the x indicating that this may be an ADSL, HSDL, VDSL network etc.). It may also be an FTTH (for "Fiber To The Home") network or a mobile network such as a 3G or 4G network. No limitation is attached to the type of the access network 1.

The devices 31-37 of the local area network 3 may be any devices, for example domestic, having a wired or wireless network connection. By way of illustrative examples, various devices are represented in FIG. 1. This may for example be a computer, a touchpad tablet 31, a mobile terminal 32, a connected radio set 33, a fixed telephone 34, an overhead projector 35, a television 36, a TV decoder 37 ("Set-Top Box"), a games console, electro-domestic devices, etc.

The local area network 3 is at least in part a wireless network of Wi-Fi type, according to IEEE standard 802.11 "Wireless LAN Medium Access Control (MAC) and Physical Layer (PHY) Specifications" (802.11a/b/g/n/ac). The access gateway 30 thus communicates with some of the devices of the local area network by way of a wireless connection, subsequently called the main wireless connection. By means of this main wireless connection, the devices of the local area network can access the wide area communication network (Internet) by way of the access gateway and of the access network 1. The data transfer rate on this main wireless connection is greater than 11 Mbits/s and depends on the version of 802.11 used. The exchanges with these devices of the local area network are performed at the level of the gateway by way of a main radio access module 302. It is stressed here that the access gateway 30 can also communicate with certain other devices of the local area network by way of a wired network connection.

The tablet 31 or the mobile terminal can execute a "my LiveBox" application allowing them to control, to configure or else to parametrize the access gateway 30 by means of a man-machine interface. This application allows it in particular to activate or to deactivate the main radio network, that is to say to turn off the main radio access module or place it on standby and/or to program such an activation or deactivation.

Subsequently the particular case is considered where the touchpad tablet 31, the mobile terminal 32 and the TV decoder 37 each employ a radio access module of Wi-Fi type to communicate with the access gateway 30. The communication network thus formed is subsequently called either the main communication network or the main radio network. The subsequent description is more precisely focused on these three devices. It is stressed that these devices 31, 32, 37 are identified here so as to illustrate the technique for managing a state of activation of the main radio network. No limitation is attached to the number of these devices, nor to the types of these devices.

The access gateway 30 and the devices 31, 32, 37 also each employ a secondary radio access module. This secondary access module is subsequently called the command module.

The access gateway 30 and the devices 31, 32, 37 exchange data, commands in particular, in this so-called command network. The command modules are of low-consumption radio type, adapted for wireless personal networks, such as Bluetooth®, Zigbee®, Z-Wave®. This type of low-power command module makes it possible to ensure radio coverage in a zone called WPAN (for "Wireless Personal Area Network").

A Bluetooth® command network relies on IEEE specification 802.15.1 "Wireless Medium Access Control (MAC) and Physical Layer (PHY) Specifications for Wireless Personal Area Networks (WPANs)" and operates in the 2.4 GHz frequency band.

A Zigbee® command network relies on IEEE specification 802.15.4 ("Low-Rate Wireless Personal Area Network (LR-WPAN) standard") and also operates in the 2.4 GHz frequency band. Zigbee® is in particular adapted to render a service for remote control of a device.

A Z-Wave® command network relies on products certified by Z-Wave Alliance and operates in the 868.42 MHz frequency band.

It is stressed here that the exchanges on the command network do not require access to another network, in particular external. These exchanges remain confined within the command network and thus within the local area network.

The access gateway 30 command module is always enabled, that is to say the command network is always active.

Figure 2A:
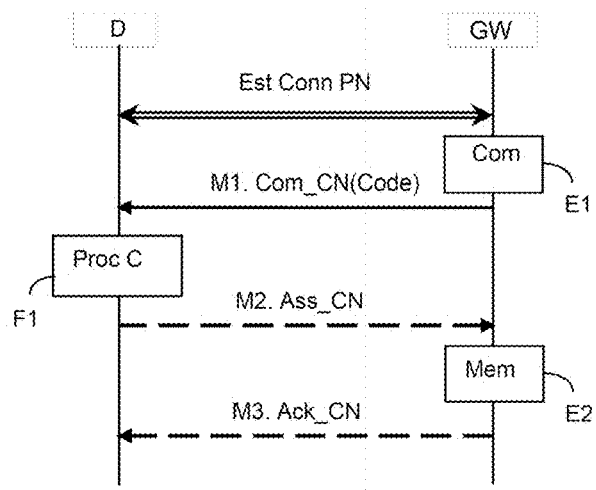
FIGS. 2a-2e illustrate steps of a management method according to particular embodiments.

We shall now describe the technique for managing a state of activation of the main radio network in particular embodiments, implemented by the access gateway 30 and one of the devices 31, 32, 37 in the environment of FIG. 1 in conjunction with FIGS. 2a-2e. FIG. 2a describes more precisely the exchanges between the access gateway and the device of the local area network during a first association of the device on the main communication network. The state of activation of the main radio network is "activated".

The steps of this association on the main network are represented in FIG. 1a in the form of a double arrow "Est Conn PN" and are not detailed more precisely. On completion of these steps, the device 31, 32, 37 is associated with the access gateway 30 on the main radio network and can thus transmit and receive data originating from other devices of the local area network 3 and from devices connected to the wide area network. A connection is thus established between the device of the local area network and the gateway on the main radio network by way of the main radio access module.

In a step E1, the access gateway 30 verifies that the device 31, 32, 37 associated on the main network is not associated on the command network and dispatches a command M1 to the device, so that the latter is associated with the gateway on the command network. When the device 31, 32, 37 has never been associated on the command network, the command M1 furthermore comprises one or more data items necessary for association on the command network. In one embodiment, this entails a PIN code, for example of four digits, defined by the access gateway 30. It is stressed here that the exchanges on the main radio network generally being protected by encryption, this or these items of association data are transmitted in a secure manner.

In a step F1, the device 31, 32, 37 transmits an association request M2 on the command network destined for the gateway. The association request M2 comprises if appropriate the item or items of data necessary for association. It is transmitted automatically by the device without intervention of the user of this device. This association on the command network is thus transparent to the user who does not have to input any confirmation, nor has any item of data necessary for association on the command network.

This association request M2 is received by the gateway 30 in a step E2. Still in this step E2, the gateway 30 stores in a table T that the device 31, 32, 37 is associated on the command network and then transmits an acknowledgment M3.

The acknowledgment M3 is received by the device 31, 32, 37, the latter then being associated with the gateway 30 on the command network.

Subsequently the case is considered where the main radio access module of the access gateway is turned off or placed on standby. The state of activation of the main radio network is "deactivated". This may be the case in particular subsequent to an action of the user via the "my LiveBox" application on his tablet 31 or his mobile terminal 32 or by a man-machine interface of the access gateway.

Figure 2B:
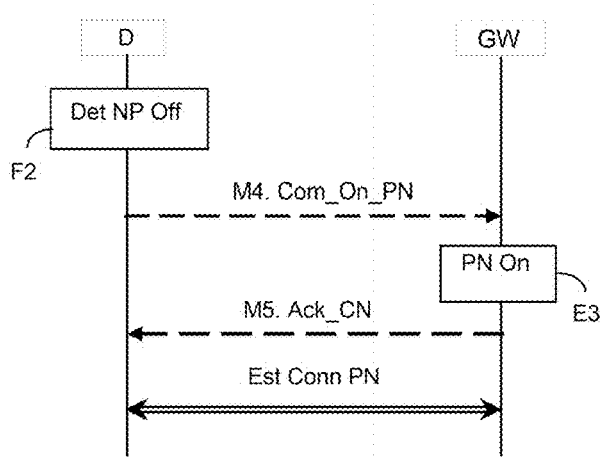
Figure 2C:
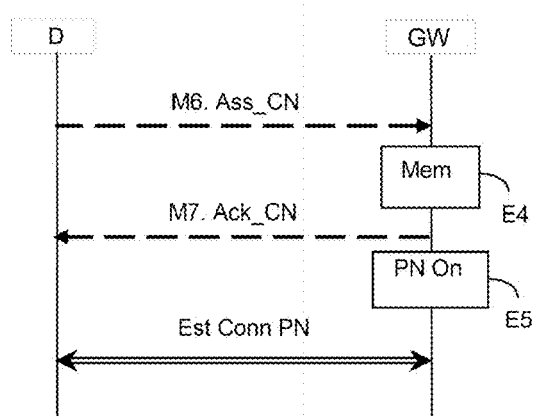

FIGS. 2b and 2c represent particular embodiments in which the main module being on standby, it is re-enabled on receipt of a message originating from one of the devices by way of the command network. Thus, these two particular embodiments comprise:
association of a device of the local area network with the gateway on the command network;
reception of a message originating from the device on the command network;
when the state of activation of the main network is deactivated, activation of the main network.

On completion of these steps, the state of activation of the main radio network is "activated". A connection between the device and the gateway can then be established on the main network.

FIG. 2b represents an embodiment in which the device 31, 32, 37 detects that the main radio network should be activated. The device 37 detects for example that an execution of a service is scheduled and that this execution requires access to the wide area communication network. By way of illustrative example, a recording of a TV transmission is scheduled from midnight to two o'clock in the morning on the device 37. If the main radio network is not activated, that is to say if the main radio module of the gateway 30 is not re-enabled, the device 37 will not be able to receive the data stream associated with this TV transmission. In another example, the user of the device 31, 32 requests the "my LiveBox" application to re-enable (or to activate) the main network.

In a step F2, the device 31, 32, 37 detects that the main communication network is not activated and transmits a command M4 for activating the main radio network. This command M4 is transmitted to the gateway 30 on the command network.

The command M4 is received by the gateway 30 in a step E3. Still in this step E3, the gateway 30 activates the main radio network by enabling the main radio access module and transmits an acknowledgment M5 to the device 31, 32, 37 that sent the activation command.

The device 31, 32, 37 can then establish a connection with the gateway 30 on the main radio network and thus access the wide area communication network.

FIG. 2c represents an embodiment in which the gateway 30 detects that the main communication network should be activated. More precisely, in this embodiment, the main radio network should be activated when the device 31, 32 associates on the command network.

The device 31, 32 transmits a request for association M6 with the gateway 30 on the command network. By way of illustrative example, the mobile terminal 32 re-enters the zone of coverage of the command network and a connection to the wide area communication network by way of the main radio network is preferable to a connection by way of the mobile network. This association on the command network is transparent to the user who does not have to input any confirmation, nor has any item of data necessary for association on the command network.

If appropriate, the request M6 comprises the item or items of data necessary for association which were obtained during the first association with the command network.

In a step E4, the gateway 30 verifies on the basis of the table T that the device 31, 32 is a device of the local area network and dispatches an acknowledgment M7 to the device 31, 32. The latter is then associated on the command network.

In a step E5, the gateway 30 activates the main radio network by enabling the main radio access module. The state of activation of the main radio network is then "activated".

The device 31, 32 can then establish a connection with the gateway 30 on the main radio network and thus access the wide area communication network.

This makes it possible to simplify for the user of the main radio network the reconnection to the local area network, by enabling the main radio network automatically on detection of the association of the device with the command network. The user does not need to interact manually with the access gateway. The steps are implemented solely at the level of the local area network, not requiring any interaction with a network external to the local area network. Moreover, the implementation of these steps of the method is completely transparent to the user. The arrival of the user's device in the zone of coverage of the command network does indeed trigger association with the command network as well as the activation of the main radio network by re-enabling the main radio access module. A turning off or placement on standby of the main radio access module can thus be implemented more frequently, on account of simpler re-enabling.

Figure 2D:
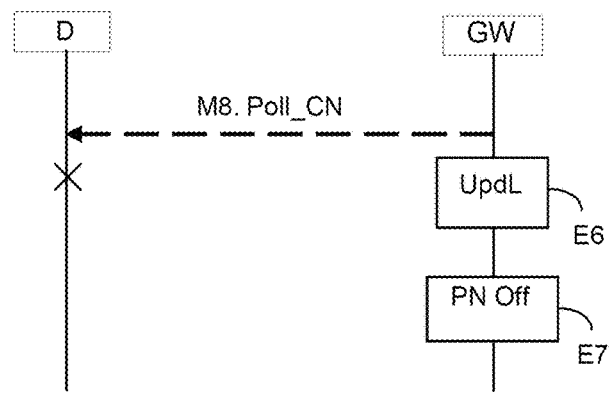

FIG. 2d represents in particular an embodiment in which the gateway 30 detects that the main radio network can be disabled. More precisely, the main radio network is deactivated when there is no longer any device of the local area network associated on the command network. On completion of these steps, the state of activation of the main radio network is "deactivated".

In a step E6, the access gateway 30 detects that the device 31, 32, is no longer present on the command network. In a particular embodiment, this detection follows an absence of response of the device to an interrogation (or "polling") message M8. Interrogation messages are for example transmitted regularly by the gateway to the associated devices on the command network. On receipt of an interrogation message, the interrogated device responds to the gateway. Other procedures are also conceivable. The device can in particular regularly transmit a message indicating its presence to the gateway. When the device is no longer associated on the command network, the gateway 30 then updates the table T.

In a step E7, the gateway 30 determines on the basis of the table T that there is no longer any associated device on the command network and triggers a deactivation of the main radio network by placing its main radio access module on standby. The state of activation of the main radio network is then "deactivated".

This makes it possible to decrease the energy consumption of the gateway 30. This embodiment is particularly advantageous when it is combined with the embodiment described in conjunction with FIG. 2c.

Figure 2E:
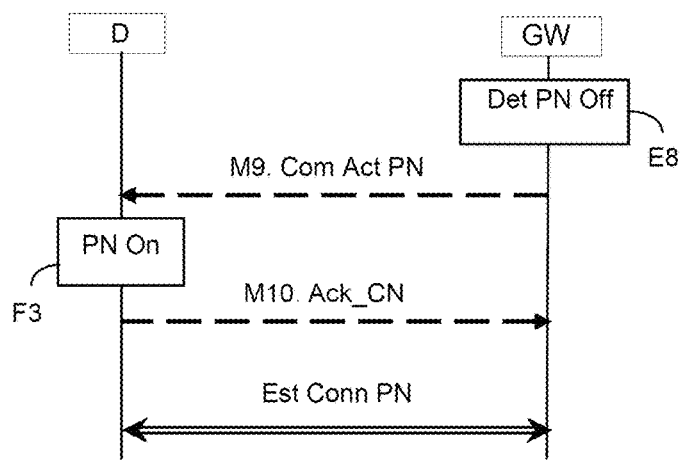

FIG. 2e represents in particular an embodiment in which the gateway 30 detects that the main radio network should be activated, that is to say enabled.

By way of illustrative example, the access gateway 30 has disabled the main network subsequent to a command from the user. The latter has for example requested, by way of the "my LiveBox" application, deactivation of the main radio network every day between midnight and eight o'clock in the morning. The corresponding main radio access modules of the devices of the main network have also been disabled by the gateway 30 before disabling its own main radio access module.

In a step E8, the gateway 30 detects that the main radio network should be activated, that is to say re-enabled, and transmits a command M9 for enabling the main radio access module to the device(s) associated on the command network. The gateway also enables its own main radio access module, if appropriate.

This command M9 is received by the device 31, 32, 37 in a step F3. Still in this step F3, the device 31, 32, 37 transmits an acknowledgment M10 to the gateway 30 and enables its main radio access module.

The device 31, 32, 37 can then establish a connection with the gateway 30 on the main radio network and thus access the wide area communication network.

Thus, the access gateway can remotely control the devices of the local area network by way of the command network, in particular to enable the main radio access modules of these devices. This allows in particular the gateway to disable the modules for radio access to the main network and to completely deactivate the main radio network. In the local area networks known from the prior art, the gateway can still control a disabling by way of the main network but without the command network, the gateway cannot thereafter re-enable them remotely. An action of the user of the device or else of an administrator of the local area network would then be necessary.

To summarize, a command network is provided as a supplement to the main radio network. The command network is permanently activated, that is to say the access gateway can at any moment receive association or management commands originating from devices of the local area network. The main radio network can be activated or deactivated, the corresponding main radio access modules being respectively enabled or disabled. The gateway 30 processes these management commands received on the command network as if they had been dispatched on the main radio network.

When a device of the local area network detects that it can no longer reach the access gateway by means of the main radio network, it communicates by means of the command network with the access gateway so as to transmit management commands, in particular for the activation of the main radio network.

The mechanism is totally transparent to the user of a device that interacts with the access gateway by means of a "my LiveBox" application. The user moreover has access to the same commands or information as when he is connected by means of the main radio network.

The command network also allows the gateway to remotely control the main radio access modules of the devices of the local area network.

The management technique also makes it possible to implement a deactivation of the main radio network when there are no longer any associated devices on the command network. Energy consumption is then decreased.

Figure 3:
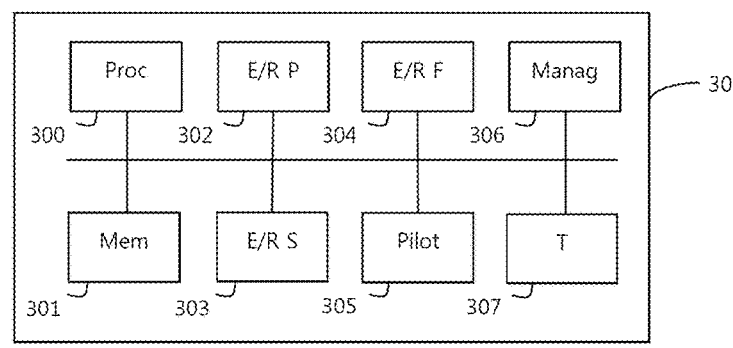
FIG. 3 represents an access gateway according to a particular embodiment.

We shall now describe an access gateway 30 to a wide area communication network in a particular embodiment with reference to FIG. 3. Such a gateway comprises in particular:

- a memory area 301, designed to store a program which comprises code instructions for implementing the steps of the method of management of a state of activation, such as described in conjunction with FIGS. 2a-2e;
- a storage memory 307, designed to store data used during the implementation of the method of management of a state of activation, such as described in conjunction with FIGS. 2a-2e, in particular the table T;
- a processor 300 for executing code instructions of software modules;
- a main radio access module 302, designed to communicate on the main network with at least one of the devices of the local area network by way of the radio access network, termed the main network;
- a secondary radio access module 303, distinct from the main radio access module, designed to communicate with a device of the local area network on the command network;
- an interface module 304 for interfacing with the access network 1, designed to send and receive data;
- a module 305 for activation/deactivation of the main network, designed to modify the state of activation of the main network from "deactivated" to "activated" on receipt of a message originating from a device on the command network;
- an association management module 306, designed to associate the gateway and a device of the local area network on one of the two networks, main or command.

It is stressed here that the access gateway 30 also comprises other processing modules, not represented in FIG. 3, designed to implement the various functions of an access gateway.

The interface module 304 is for example an xDSL, FTTH, 3G, 4G module.

In a particular embodiment, the association management module 306 is designed to command the association of the device with the gateway subsequent to a first establishment of connection of the device on the main network.

In a particular embodiment, the module 305 for activation/deactivation of the main network is designed to modify the state of activation of the main network from "deactivated" to "activated" on receipt of a main network activation command.

In a particular embodiment, the module 305 for activation/deactivation of the main network is designed to modify the state of activation of the main network from "deactivated" to "activated" on receipt of a request for association of the device with the gateway on the command network.

In a particular embodiment, the association management module 306 is furthermore designed to detect that there is no longer any device of the local area network associated on the command network and the module 305 for activation/deactivation of the main network is then designed to modify the state of activation of the main network from "activated" to "deactivated".

In a particular embodiment, the module 305 for activation/deactivation of the main network is furthermore designed to command an enabling of a main radio access module of the device by way of the command network.

The management technique is implemented by means of software components and/or hardware components. In this regard, the term "module" may correspond in this document either to a software component, or to a hardware component or to a set of hardware components and/or software components, which is able to implement a function or a set of functions, according to what is described above in respect of the module concerned.

A software component corresponds to one or more computer programs, one or more subprograms of a program, or more generally to any element of a program or of a piece of software. Such a software component is stored in memory and then loaded and executed by a data processor of a physical entity and is able to access the hardware resources of this physical entity (memories, recording media, communication buses, electronic input/output cards, user interfaces, etc).

In the same manner, a hardware component corresponds to any element of a hardware set. This may or may not be a programmable hardware component, with or without integrated processor for the execution of software. This entails for example an integrated circuit, a chip card, an electronic card for the execution of firmware, etc.

In a particular embodiment, the modules 300, 305, 306 are designed to implement the management method described above. These preferably entail software modules comprising software instructions for executing those of the steps of the above-described management method that are implemented by an access gateway. The present disclosure therefore also relates to:
- a program for an access gateway, comprising program code instructions intended to command the execution of the steps of the above-described management method, when said program is executed by this access gateway;
- a recording medium readable by an access gateway and on which the program for a gateway is recorded.

The software modules can be stored in or transmitted by a data medium. The latter can be a hardware storage medium, for example a CD-ROM, a magnetic recording means, for example a magnetic diskette or a hard disk. Moreover, the data medium can be a transmission medium such as an electrical, optical or radio signal, which can be conveyed via an electrical or optical cable, by radio or by other means. The program code instructions can in particular be downloaded from a network of Internet type.

Alternatively, the data medium can be an integrated circuit in which the program is incorporated, the circuit being adapted for executing or to being used in the execution of the management method described above.

The present disclosure also relates to a system in a local area network, comprising an access gateway such as described above and at least one device of the local area network. This device comprises:
- a memory area, designed to store a program which comprises code instructions for implementing the steps of the method of management of a state of activation that are implemented by the device;
- a storage memory, designed to store data used during the implementation of the method of management of a state of activation:
- a processor for executing code instructions of software modules;
- a main radio access module, designed to communicate on the main network with at least the gateway;
- a secondary radio access module, distinct from the main radio access module, designed to communicate with the gateway on the command network;
- a module for dispatching a message to the gateway on the command network.

The dispatching module is in particular designed to dispatch a request for association of the device with the gateway on the command network.

In a particular embodiment, the dispatching module is furthermore designed to dispatch a main network activation command. The activation command is in particular transmitted when an execution of a service is scheduled on the device, this execution requiring access to the wide area communication network.

Although the present disclosure has been described with reference to one or more examples, workers skilled in the art will recognize that changes may be made in form and detail without departing from the scope of the disclosure and/or the appended claims.

The invention claimed is:

1. A method of managing a state of activation of a radio access network in a local area network, a gateway allowing access to a wide area communication network to devices of the local area network and communicating with at least one of the devices of the local area network by way of the radio access network, termed a main network, said method comprising the following acts implemented by the gateway:
   on a secondary radio access network, associating a device of the local area network with the gateway, the secondary radio access network being termed a command network, which is distinct from the main network;
   receiving a message originating from said device on the command network;
   when the state of activation of the main network is deactivated:
      activating, by the gateway, the main network by enabling a main radio access module of the gateway; and
      transmitting a command, by the gateway, to the associated device on the command network, said command instructing the associated device to activate the associated device's main radio access module, and
   establishing a connection between said device and the gateway on the main network.

2. The method of managing according to claim 1, in which the gateway commands the association of the device with the gateway subsequent to a first establishment of connection of the device on the main network.

3. The method of managing according to claim 2, in which the gateway commands the association with an association command comprising at least one item of data necessary for the association of the device with the gateway.

4. The method of managing according to claim 1, in which the message received is a main network activation command.

5. The method of managing according to claim 4, in which the main network activation command is transmitted when execution of a service is scheduled on said device, said execution requiring access to the wide area communication network.

6. The method of managing according to claim 1, in which the message received is a request for association of the device with the gateway on the command network.

7. The method of managing according to claim 1, in which a deactivation of the main network is triggered by the gateway when there is no longer any device of the local area network associated on the command network.

8. An access gateway allowing access to a wide area communication network to devices of the local area network and communicating with at least one of the devices of the local area network by way of the radio access network, termed a main network, said gateway comprising:

a main radio access module, configured to communicate on the main network;

a secondary radio access module, distinct from the main radio access module, configured to communicate with a device of the local area network on the command network;

an association management module, configured to associate the gateway and a device of the local area network on one of the networks, main or command; and a module configured to modify a state of activation of the main network from deactivated to activated on receipt of a message originating from a device on the command network by enabling a main radio access module of the gateway and to transmit a command to the associated device on the command network, said command instructing the associated device to activate the associated device's main radio access module.

9. A system in a local area network, comprising:

an access gateway allowing access to a wide area communication network to devices of the local area network and communicating with at least one of the devices of the local area network by way of the radio access network, termed a main network, said gateway comprising:
- a main radio access module, configured to communicate on the main network;
- a secondary radio access module, distinct from the main radio access module, configured to communicate with a device of the local area network on the command network;
- an association management module, configured to associate the gateway and a device of the local area network on one of the networks, main or command; and
- a module configured to modify a state of activation of the main network from deactivated to activated on receipt of a message originating from a device on the command network by enabling a main radio access module of the gateway and to transmit a command to the associated device on the command network, said command instructing the associated device to activate the associated device's main radio access module; and at least one of the devices of the local area network, said at least one device comprising:
- a main radio access module, configured to communicate on the main network with at least the gateway;
- a secondary radio access module, distinct from the main radio access module of the device, configured to communicate with the gateway on the command network; and
- a module configured to dispatch a message to the gateway on the command network.

10. A hardware recording medium readable by an access gateway and on which a program is recorded, comprising program code instructions that command execution of method for managing a state of a radio access network in a local area network by the gateway, when said program is executed by the gateway, the gateway allowing access to a wide area communication network to devices of the local area network and communicating with at least one of the devices of the local area network by way of the radio access network, termed a main network, said method comprising the following acts implemented by the gateway:

on a secondary radio access network, associating a device of the local area network with the gateway, the secondary radio access network being termed a command network, which is distinct from the main network;

receiving a message originating from said device on the command network;

when the state of activation of the main network is deactivated:
- activating the main network by enabling a main radio access module of the gateway; and
- transmitting a command to the associated device on the command network, said command instructing the associated device to activate the associated device's main radio access module; and establishing a connection between said device and the gateway on the main network.

* * * * *